United States Patent
Hanks

(10) Patent No.: US 7,506,377 B2
(45) Date of Patent: Mar. 17, 2009

(54) METHOD AND APPARATUS FOR PLAYING CONTENT

(75) Inventor: Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 10/460,559

(22) Filed: Jun. 11, 2003

(65) Prior Publication Data

US 2005/0005104 A1    Jan. 6, 2005

(51) Int. Cl.
*G06F 7/04* (2006.01)

(52) U.S. Cl. .............................. 726/26; 726/27; 726/28; 726/29; 726/30

(58) Field of Classification Search ........................ None
See application file for complete search history.

(56) References Cited

U.S. PATENT DOCUMENTS

| | | | |
|---|---|---|---|
| 5,754,648 A | | 5/1998 | Ryan et al. |
| 5,784,462 A | * | 7/1998 | Tomida et al. ............... 380/270 |
| 5,787,171 A | * | 7/1998 | Kubota et al. ............... 380/239 |
| 6,061,451 A | | 5/2000 | Muratani et al. |
| 6,161,179 A | | 12/2000 | Seidel |
| 6,249,532 B1 | * | 6/2001 | Yoshikawa et al. .......... 370/486 |
| 6,275,588 B1 | | 8/2001 | Videcrantz et al. |
| 6,347,846 B1 | | 2/2002 | Nakamura |
| 6,363,357 B1 | | 3/2002 | Rosenberg et al. |
| 6,381,732 B1 | * | 4/2002 | Burnham et al. ............... 716/8 |
| 6,721,422 B2 | * | 4/2004 | Van de Haar ............... 380/241 |
| 2001/0037465 A1 | * | 11/2001 | Hart et al. .................... 713/201 |
| 2002/0147686 A1 | * | 10/2002 | Safadi et al. .................. 705/51 |
| 2006/0106724 A1 | * | 5/2006 | Bar-On ....................... 705/57 |

FOREIGN PATENT DOCUMENTS

| | | |
|---|---|---|
| CN | 1176014 A | 3/1998 |
| EP | 1302945 A1 | 4/2003 |
| EP | 1404132 A1 | 3/2004 |
| GB | 2386210 A | 9/2003 |
| GB | 2393064 B | 9/2004 |
| JP | 2002164881 A | 6/2002 |

OTHER PUBLICATIONS (Alfred J. Menezes, Paul C. van Oorschot, Scott A. Vanstone, "Handbook of applied cryptography", 1997, ISBN: 0849385237), p. 11-16.*

Newton (Harry Newton, "Newton's Telecom Dicionary", 19th edition, ISBN: 1578203074, Mar. 2003), p. 638.*

(Continued)

*Primary Examiner*—Kambiz Zand
*Assistant Examiner*—Peter Poltorak

(57) ABSTRACT

Methods and apparatus are disclosed for playing content. In one embodiment, an identification key is generated. The identification key is encrypted and transmitted to a playback drive. Encrypted content containing a content identification key is received. If the content identification key matches the identification key that was generated, the content is decrypted and played.

17 Claims, 5 Drawing Sheets

OTHER PUBLICATIONS

Patent Office of the People's Republic of China, First Office Action for Chinese Patent Application No. 200410049050.5, Feb. 15, 2008.

Abstract of JP2002164881, "Data Terminal Device," filed Jun. 7, 2002.

Fumitada Takahashi, et al., Nikkei Electronics Asia: May 1999—Special Report, "Music Over Internet Set to Explode", pp. 1-7.

Maurice Maes, et al., IEEE Signal Processing Magazine, Sep. 2000, "Digital Watermarking for DVD Video Copy Protection", pp. 1-10.

John Villasenor, et al., Scientific American Jun. 1997, "Configurable Computing", pp. 66-71.

Darwin Mitchel Hanks, et al., New Patent Application, "Content Encryption Using Programmable Hardware", 32 pages of specification, claims and abstract, and 10 sheets of drawings.

* cited by examiner

METHOD AND APPARATUS FOR PLAYING CONTENT

BACKGROUND OF THE INVENTION

In the emerging Internet enabled world of digital asset commerce, the ease with which assets may be transferred enables many new business possibilities. Unfortunately, this ease of transfer also exposes digital assets to widespread illegal copying and distribution. Content that is in digital form can be copied without degradation. As a result, distributors and artists lose potential sales to customers who might otherwise purchase content, but instead obtain it illegally.

Various encryption schemes have been developed to protect the content. However, the content may be exposed in unencrypted form when it is played back to a remote location such as an audio system or video monitor. Thus, knowledgeable intruders can intercept the content while it is being transferred from a playback drive to a remote playback device.

SUMMARY OF THE INVENTION

Methods and Apparatus are disclosed for playing content. In one embodiment, an identification key is generated and encrypted. The encrypted identification key is transferred to a playback drive. Encrypted content containing a content identification key is then received. If the identification key matches the content identification key, the content is decrypted and played.

In another embodiment, an encrypted identification key is received from a playback device. The identification key is decrypted and embedded into content. The content embedded with the identification key is encrypted and transmitted to the playback device.

BRIEF DESCRIPTION OF THE DRAWINGS

Illustrative embodiments of the invention are illustrated in the drawings in which.

DETAILED DESCRIPTION

Figure 1:
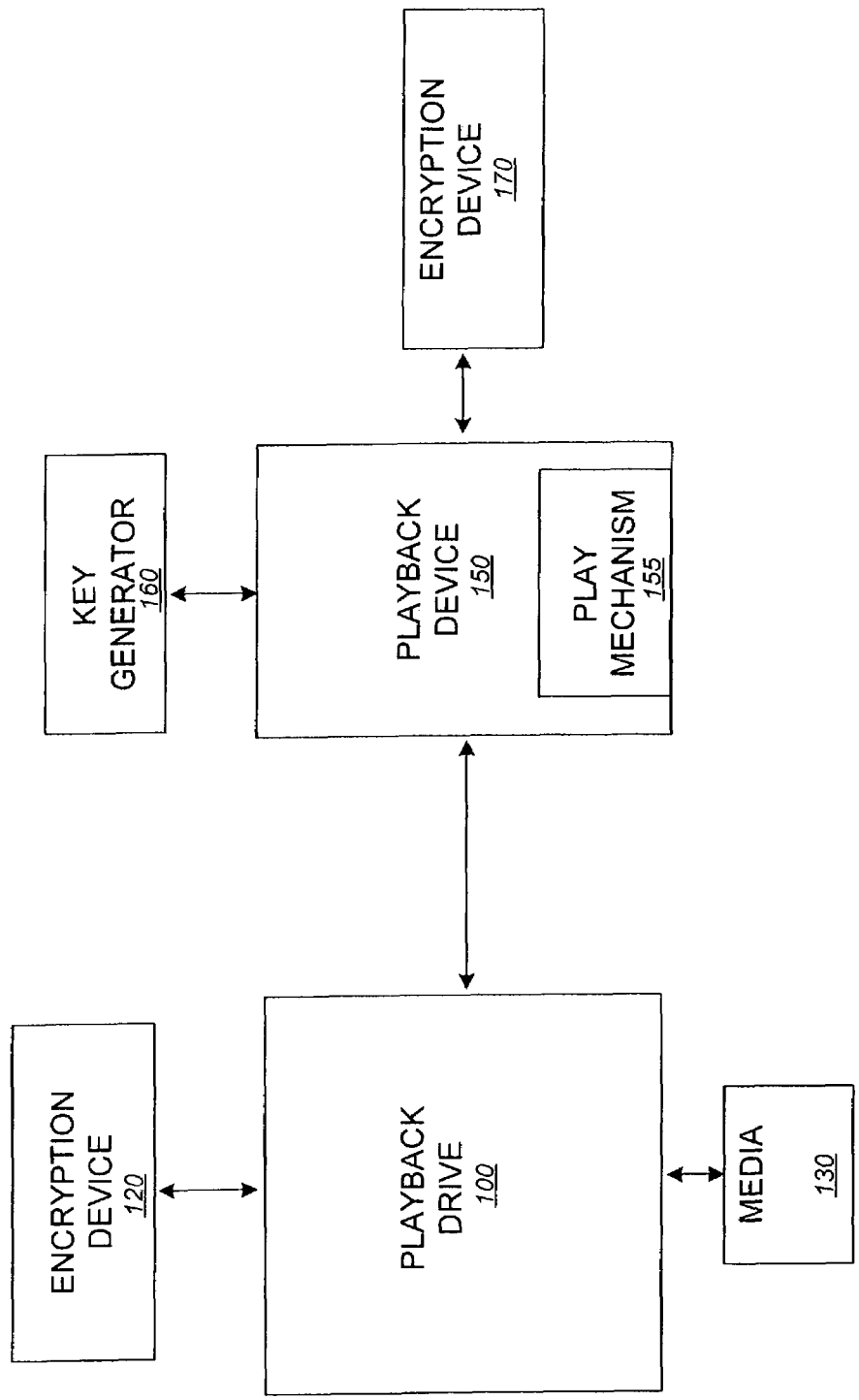
FIG. 1 is a block diagram showing an exemplary configuration of a playback drive and a playback device.

An exemplary configuration containing a playback drive 100 for providing content to a playback device 150 is shown in FIG. 1. Playback drive 100 is coupled, via a cable, wire, wireless connection, or other type of connection, to playback device 150. By way of example, playback drive 100 may be a computer, a compact disk (CD) player, a digital versatile disk (DVD) player, or other type of device that transfers content to a playback device. Playback device 150 may be a stereo, video monitor, computer monitor, television, or other device that plays content.

Playback drive 100 is also coupled to media 130. Media 130 may be a CD, a DVD, a tape, a hard disk drive, or other type of storage medium that contains the content to be played.

Additionally, an encryption device 120 is coupled to playback drive 100. An encryption device 170 is also coupled to playback device 150. The couplings may be any type of coupling, such as a bus, cable, network, wireless mechanism, or other mechanism, that allows communication between the components. It should be appreciated that encryption device 120 may be a component of playback drive 100 and encryption device 170 may be a component of playback device 150.

Encryption devices 120, 170 are devices that may be used to encrypt and decrypt data. By way of example, encryption devices 120, 170 may be software or programmable hardware, such as a field programmable gate array (FPGA), a programmable logic device (PLD), or a microprocessor. It should be appreciated that encryption device 120 may be a different type of device than encryption device 170.

Playback device 150 also includes a play mechanism 155 to play content. The play mechanism may be an audio component that transmits audio to a listener, a video display component that plays video, a graphics card of a computer monitor, or another type of component that plays video, still, or audio.

Additionally, playback device 150 is additionally coupled, via a communicative coupling, to key generator 160. In one embodiment, key generator 160 may be a random number generator. Key generator 160 is used to generate an identification key used in the encryption process. In some embodiments, key generator 160 may be a component of encryption device 170.

Figure 2:
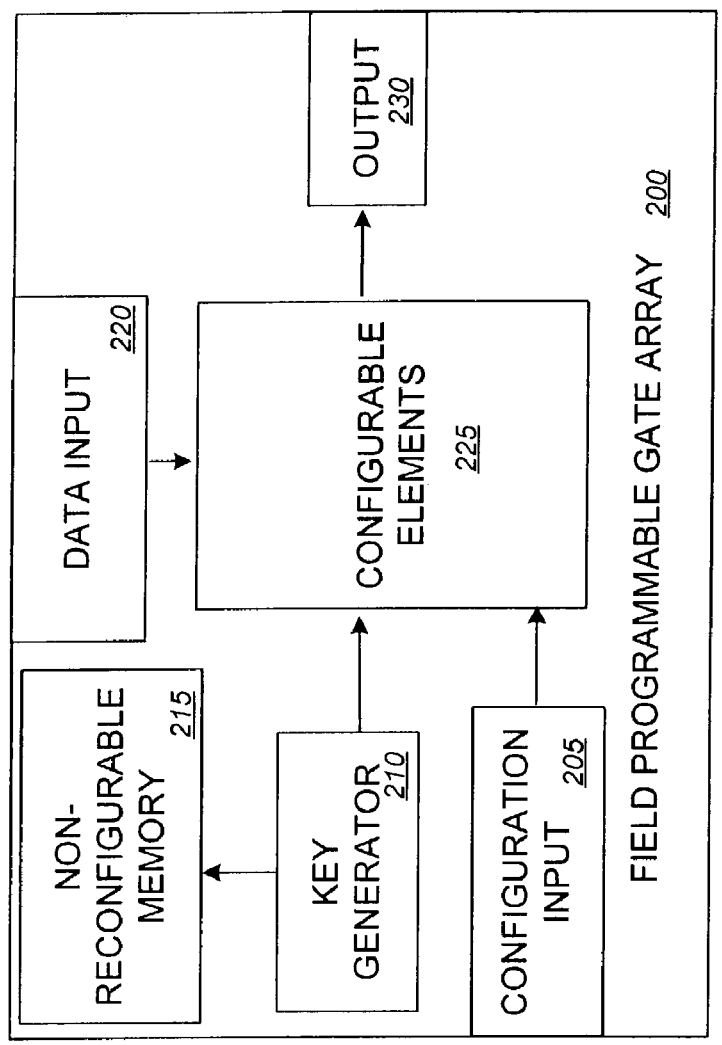
FIG. 2 illustrates an exemplary embodiment of the encryption device shown in FIG. 1.

In one embodiment, encryption device 170 may be a field programmable gate array (FPGA) 200 as illustrated in FIG. 2. FPGA 200 includes a configuration input 205 to receive a configuration pattern, such as a configuration bit stream. The configuration pattern is used to configure configurable elements 225. Configurable elements 225 may consist of series or arrays of logic gates, such as AND, OR, NAND, and NOR gates. Configurable elements may also be storage elements, such as flip flops.

Different configuration patterns may be used to configure FPGA 200 with a variety of different configurations. Data input 220 inputs data into a configuration of FPGA 200. Data is manipulated differently depending upon the configuration of the configurable elements. Playback device 150 may not know the configuration of the FPGA 200 generated by a particular configuration pattern and as a result may not know the manner in which the FPGA 200 manipulates data when configured with a particular pattern. A data output 230 is coupled to the configurable elements and is used to output the manipulated data.

FPGA 200 also includes a non-reconfigurable memory 215. Non-reconfigurable memory 215 may be used to store an identification key used in the encryption process. Additionally, FPGA 200 includes a key generator 210 to generate the identification key and to initially configure non-reconfigurable memory 215 with the identification key. After the identification key is stored, non-reconfigurable memory 210 cannot be reconfigured. In other embodiments, FPGA 200 may not include the non-reconfigurable memory 215 or the key generator 210.

Figure 3:
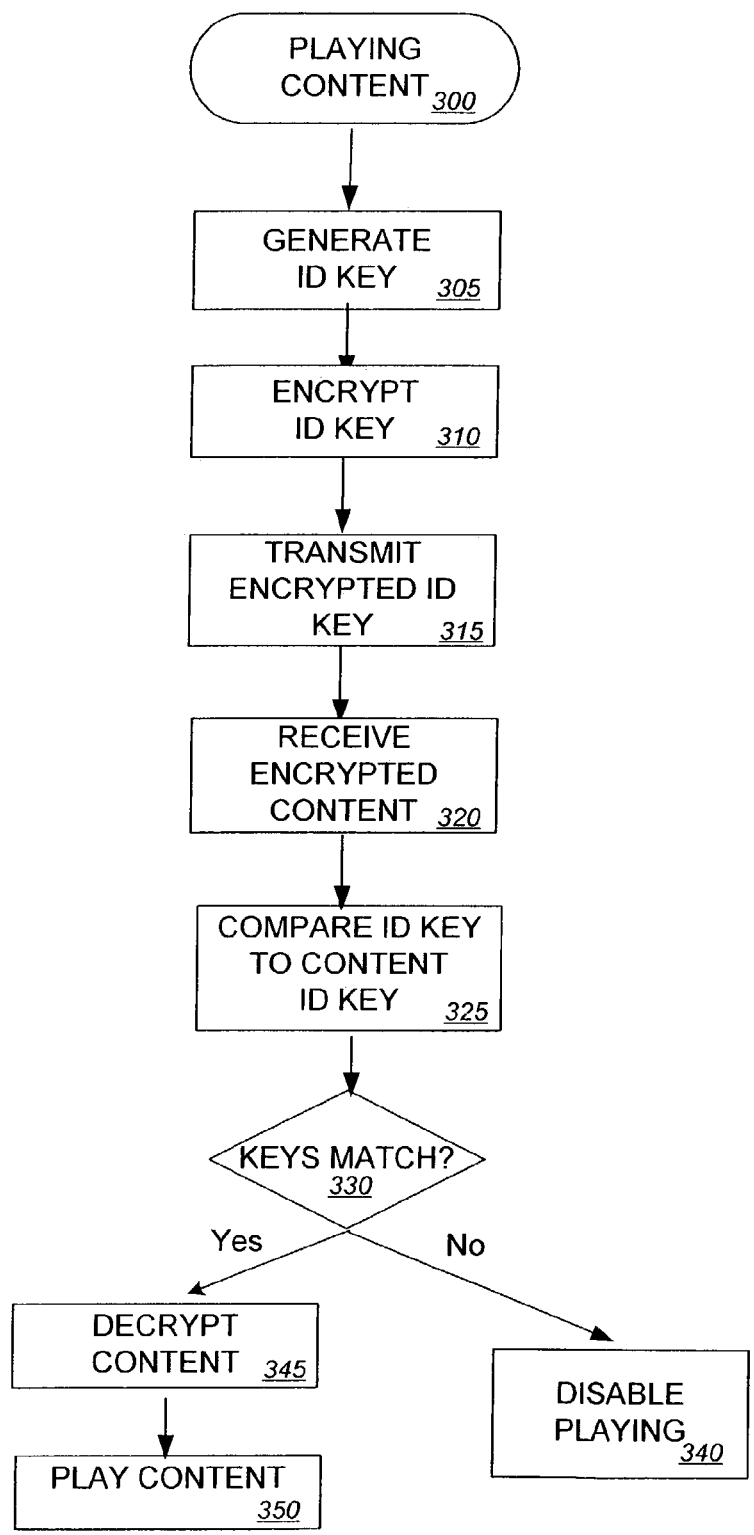
FIG. 3 is a flow diagram illustrating an exemplary method for playing content that may be used by the playback device shown in FIG. 1.

FIG. 3 illustrates a method for playing content 300 that may be used by a playback device. The method begins with generating an identification key 305. For example, the identification key may be a random number generated by any type of random number generator. In one embodiment, the identification key may be generated by an FPGA 200 that includes a key generator. The FPGA may generate a random number by interacting with a circuit external to the FPGA, such as an analog noise generator, to seed the generator. Additionally, the identification key may be stored in a location for later reference. By way of example, the identification key may be stored in a non-reconfigurable memory of an FPGA.

Figure 4:
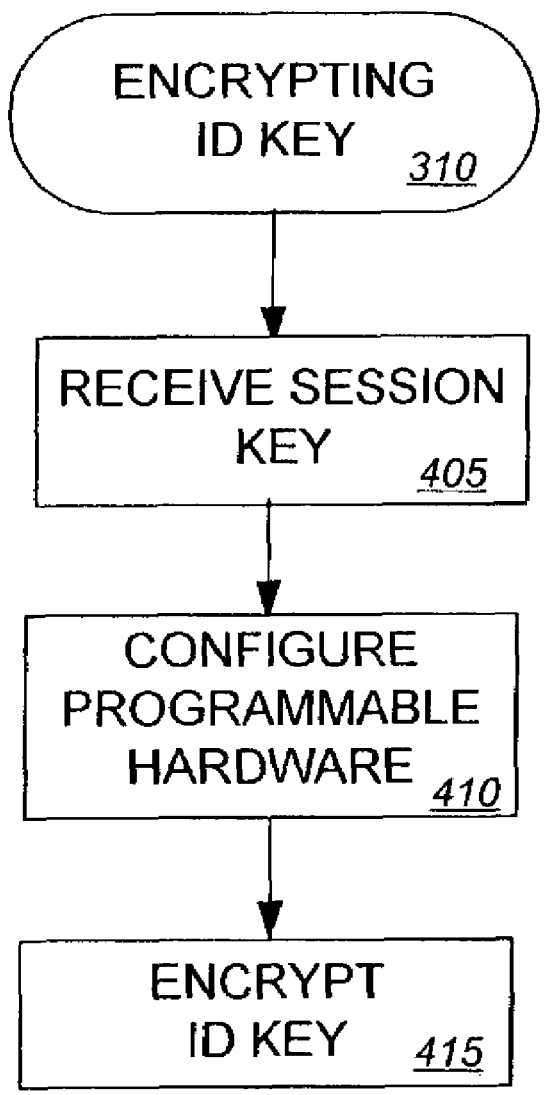
FIG. 4 is a flow diagram illustrating an exemplary method for encrypting an identification key that may be used in the method of FIG. 4.

Next, the identification key is encrypted 310. The identification key may be encrypted with any encryption scheme. In one embodiment, the identification key may be encrypted using programmable hardware, such as an FPGA 200. FIG. 4 illustrates a exemplary method using programmable hardware that may be used to encrypt the identification key.

First, a session key is received 405 from the playback drive. This session key can be a bit stream or other type of configuration pattern that is used to configure programmable hardware. Next, programmable hardware is then configured with a first configuration by using the session key 410. For example, the session key may be input into a configuration port of an FPGA and used to configure the FPGA. The resulting configuration of the programmable hardware is logic that will manipulate data according to an algorithm determined by the configuration.

The configured programmable hardware is used to encrypt the identification key 415. The identification key can be streamed through the programmable hardware to produce an encrypted key. The programmable hardware will encrypt the identification key with the algorithm determined by the first configuration of the programmable hardware.

Returning to FIG. 3, after the identification key is encrypted it is transmitted to the playback drive 315. Next, encrypted content is then received from the playback drive 320. The encrypted content contains the requested content and a content identification key in encrypted form. The content identification key may be used to ensure that the content can only be decrypted by the playback device having access to the identification key.

After the encrypted content is received, the identification key is compared to the content identification key 325. In one embodiment, a programmable hardware, such as an FPGA, is configured using a content access key that was received as a header to the encrypted content. At least a portion of the encrypted content is streamed through the configured hardware until the content identification key is located and decrypted. It should be appreciated that in alternate embodiments the content identification key may be obtained and decrypted using any known decryption mechanism.

If the identification key does not match the content identification key, the content is not played 340. The comparison of keys may prevent the playing of content previously intercepted by an intruder from being played. If the content identification key matches the identification key generated in 305, the content is decrypted 345. The content may be decrypted using any know mechanism of decrypting content.

In one embodiment, the content is decrypted using a programmable hardware, such as an FPGA 200. The programmable hardware is configured using a content access key received as a header to the encrypted content. Next, the content is decrypted using the configured programmable hardware. This may be done by streaming the encrypted content through a data input of the programmable hardware. The streamed content is then decrypted according to a decryption algorithm determined by the configuration of the programmable hardware.

After the content is decrypted, the content is played 350 by driving the appropriate playback mechanism of the playback device. By way of example, the content may be played by driving a graphics card of a personal computer monitor, driving a video display component, and/or driving an audio display component. It should be appreciated that the playback mechanism used to play the content may vary depending upon the type of content and the type of playback device.

In alternate embodiments, the playback device may have a device identification key associated with it. This device identification key may be used in place of the generated identification key. Thus, blocks 305, 310, and 315 may not be performed. Instead, the device identification key may be compared to the content identification key. By way of example, a programmable device may be configured using a content access key. The encrypted content may be streamed through the programmable device. If the content identification key found in the content does not match the device identification key, the streaming may be disabled. Otherwise, the content may be decrypted and played.

In another alternate embodiment, the received content may not contain the identification key. Instead, the identification key may be used by the playback drive to encrypt the content according to an algorithm determined by the identification key. The playback device may then use the identification key to decrypt the content. This may limit playback of the content to the playback device that generated or has access to the identification key used to encrypt the content.

Figure 5:
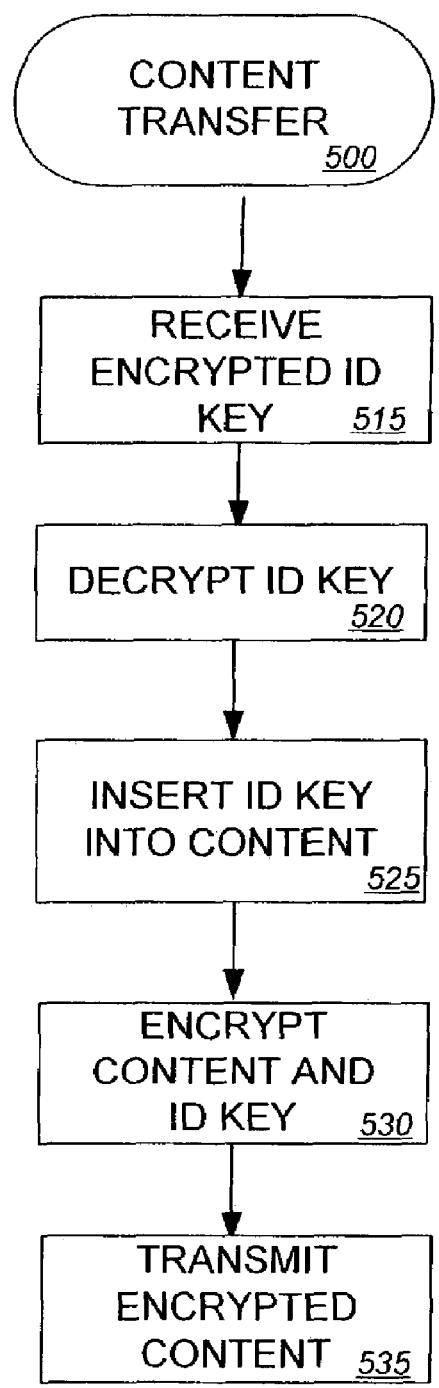
FIG. 5 illustrates an exemplary method for the transfer of encrypted content that may be used by the playback drive shown in FIG. 1.

FIG. 5 is a flow diagram illustrating a content transfer process 500 that may be used by a playback drive transferring content to a playback device. First, an encrypted identification key is received 515 from the playback device. In one embodiment, the encrypted identification key is received in response to the playback drive sending a session key, to be used to encrypt the identification key, to the playback device. The session key may have been obtained from a key library, the same storage medium containing the content to be played, or another storage location.

Next, the encrypted identification key is decrypted 520. The playback drive has access to the key or algorithm needed to decrypt the identification key. Any mechanism of decryption may be used to decrypt the identification key.

In one embodiment, the identification key may be decrypted using programmable hardware. The programmable hardware is configured in a first configuration using the appropriate key. The key may have been obtained from a key library, the storage medium containing the content to be played, or another storage location. The key used to configure the programmable hardware may be the same as the session key sent to the playback device or it may be different. The identification key is then decrypted according to the decryption algorithm determined by the first configuration.

The identification key is then inserted into one or more locations of the content to be played on the playback device 525. Next, the content containing the identification key is encrypted. Any encryption method may be used to perform the encryption.

In one embodiment, programmable hardware, such as an FPGA, is used to perform the encryption. The programmable hardware is configured using a key obtained from a key library, the storage medium containing the content to be played, or other storage location. The configured programmable hardware is then used to encrypt the content with an encryption algorithm determined by its configuration. During the encryption process, the configured programmable hardware may also be used to insert the identification key into one or more locations of the content. The insertion of the identification key may also occur before the encryption process After the content is encrypted, the encrypted content containing the identification key is transmitted to the playback device 535. In one embodiment, a content access key that may be used to configure the playback device's programmable hardware to decrypt the encrypted content is also transmitted.

In an alternate embodiment, the identification key may not be embedded into the content. Instead, the playback drive may use the identification key to encrypt the content according to an algorithm determined by the identification key. By way of example, programmable hardware may be configured with the identification key and then used to encrypt the content.

What is claimed is:

1. A method comprising:
   receiving, at the playback device, a session key from the playback drive;
   configuring programmable hardware using the received session key;
   generating an identification key;
   encrypting the identification key via the programmable hardware;
   transmitting the encrypted identification key from a playback device to a playback drive;
   decrypting the encrypted identification key transmitted from the playback device;
   receiving, at the playback device, encrypted content containing a content identification key from the playback drive;
   decrypting the content identification key; and
   if the content identification key matches the identification key, decrypting
   at least a portion of the encrypted content via the programmable hardware, and playing the portion.

2. The method of claim 1, wherein the playing comprises driving a graphics card of a personal computer monitor.

3. The method of claim 1, wherein the playing comprises driving a video display component.

4. The method of claim 1, wherein the playing comprises driving an audio component.

5. The method of claim 1, wherein the programmable hardware comprises a field programmable gate array (FPGA).

6. The method of claim 1, further comprising transmitting the encrypted content from the playback drive directly to the playback device.

7. The method of claim 1, further comprising:
   configuring second programmable hardware based on the session key,
   wherein the decrypting the encrypted identification key transmitted from the playback device is performed by the second programmable hardware.

8. A playback device comprising:
   an identification key generator;
   an interface to transmit an encrypted identification key and to receive encrypted content embedded with a content identification key;
   an encryption device having programmable hardware, the encryption device to configure the programmable hardware using a received session key, the programmable hardware configured by the session key to encrypt the identification key, the programmable hardware further configured by the session key to decrypt the content identification key and to decrypt at least a portion of the encrypted content, thereby forming decrypted content, if the content identification key matches the identification key; and
   a play mechanism to play the decrypted content.

9. The playback device of claim 8, further comprising a digital to analog converter to convert the decrypted content to analog format, and wherein the display device displays the decrypted content in analog form.

10. The playback device of claim 8, wherein the programmable hardware comprises a field programmable gate array (FPGA).

11. The playback device of claim 8, wherein the play mechanism comprises one of a stereo component, a television, and a computer monitor.

12. A system comprising:
    a playback device to transmit an encrypted identification key to a playback drive and to receive encrypted content from the playback drive, the playback device including an identification key generator to generate an identification key, a first encryption device, and a play mechanism to play decrypted content, the first encryption device having programmable hardware, the first encryption device to configure the programmable hardware using a session key received from the playback drive, the programmable hardware configured by the session key to encrypt the identification key, to decrypt a content identification key received with the encrypted content, and to decrypt at least a portion of the encrypted content if the content identification key matches the identification key; and
    the playback drive, the playback drive to receive the encrypted identification key from the playback device and to transmit the encrypted content to the playback device, the playback drive including a second encryption device, the second encryption device to decrypt the encrypted identification key, to insert the identification key into at least one location of content, and to encrypt the content containing the identification key.

13. A system comprising:
    a playback drive to receive a first key, in encrypted form, the playback drive to decrypt the first key and to encrypt content, the playback drive further to transmit a session key and the content, in encrypted form, wherein the transmitted content is based on the first key and includes a content identification key; and
    a playback device to transmit the first key, in encrypted form, to the playback drive, the playback device further to receive the transmitted content and session key and to configure programmable hardware using the session key, the programmable hardware configured by the session key to encrypt the first key and to decrypt at least a portion of the transmitted content based on the first key if the content identification key matches the first key, the playback device further to play the decrypted content.

14. The system of claim 13, wherein the playback device comprises a video monitor having the programmable hardware.

15. The system of claim 13, wherein the playback device comprises a television having the programmable hardware.

16. The system of claim 13, wherein the playback device comprises a stereo having the programmable hardware.

17. The system of claim 13, the playback device to read the content from a media coupled to the playback drive.

* * * * *